PULSE CODE MODULATION CODER

Filed March 2, 1953

INVENTOR
W. M. GOODALL
BY Hugh S. Wertz
ATTORNEY

Jan. 31, 1956 W. M. GOODALL 2,733,410

PULSE CODE MODULATION CODER

Filed March 2, 1953 3 Sheets-Sheet 2

INVENTOR
W. M. GOODALL
BY Hugh S. Wertz
ATTORNEY

INVENTOR
W. M. GOODALL
BY Hugh S. Wertz
ATTORNEY 2,733,410

PULSE CODE MODULATION CODER

William M. Goodall, Oakhurst, N. J., assignor to Bell Telephone Laboratories, Incorporated, New York, N. Y., a corporation of New York Application March 2, 1953, Serial No. 339,851

7 Claims. (Cl. 332—11)

This application relates to electrical coders of the type which translates the instantaneous magnitude of a continuously variable electrical signal into discrete voltage levels at a plurality of output terminals, and establishes a digital representation of this magnitude.

In the pulse code modulation art, amplitude sensitive multistate devices, which have a number of relatively stable output levels separated by transition points between levels, and have stair-step input-output characteristics, have been used heretofore. The devices disclosed in B. M. Oliver application Serial No. 203,652, filed December 30, 1950, are multistate devices of this type. A cathode ray tube with a stepwise apertured mask to selectively intercept portions of a ribbon electron beam in accordance with its deflection may also be used as an amplitude sensitive multistate device.

In certain types of pulse code modulation systems employing this type of element, however, the individual multistate devices, or "quantizers," for the respective output digits do not consistently operate in synchronism, and coding errors occur. Another difficulty lies in the great number of multistate devices which are required in some of the known pulse code modulation systems.

One object of the present invention, therefore, is to provide an improved coder in which errors of the type noted above are avoided and which employs a relatively small number of quantizers.

The coding circuits in accordance with the invention reduce the complexity of the quantizers and secure consistent operation by the use of a subtractive combination of quantizer outputs in which the digital transitions which should occur simultaneously have a common origin.

A feature of the invention resides in the adaptability of the coder circuits to digital coding systems having numerical bases, or radices, of 3, 4, or more, as well as to the more widely used binary system.

Other objects, features and advantages of the instant coder circuits will become apparent in the course of the detailed description of certain illustrative embodiments of the principles of the invention which are shown in the drawings.

Figures 1, 2, 3:
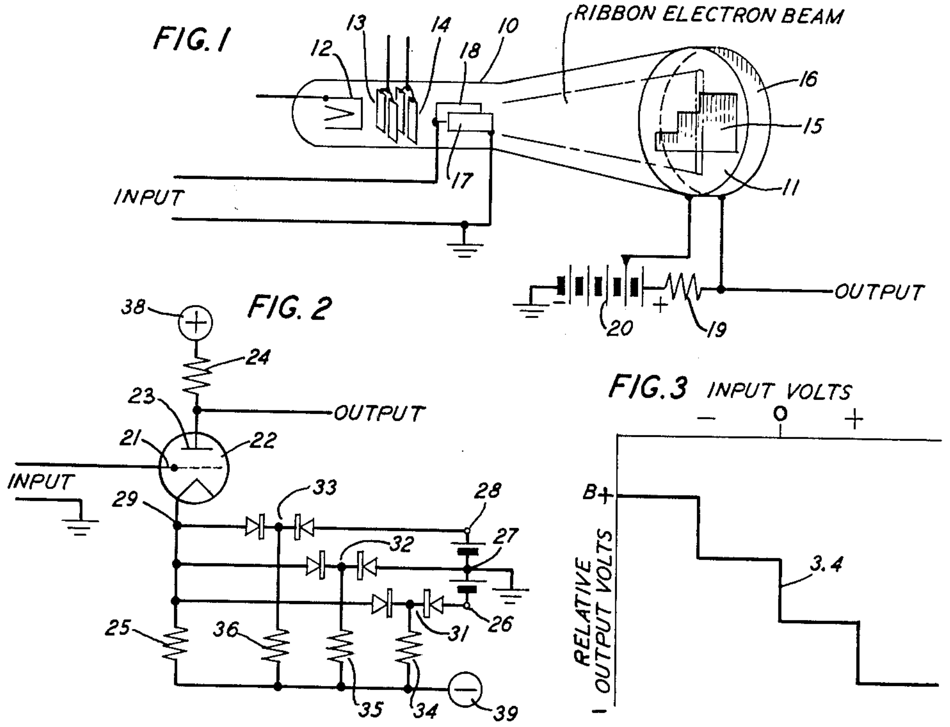
Fig. 1 illustrates a quantizer of the masked cathode ray tube type.
Fig. 2 shows a quantizer circuit employing diode gates.
Fig. 3 is the output-input characteristic plot of the quantizers of Figs. 1 and 2.

The basic element in the type of coders considered herein is an amplitude-sensitive multistate device which is termed a "quantizer." Two types of quantizers are shown in Figs. 1 and 2, and both of these quantizers have stair-step characteristic curves of the type shown in Fig. 3.

The quantizer of Fig. 1 employs a cathode ray tube 10 with a mask 11 which selectively intercepts electrons from the vertical line ribbon electron beam formed by the cathode 12 and the pairs of plates 13 and 14. Although shown schematically in Fig. 1, the line beam-forming structure may be of the form shown in greater detail in A. M. Skellett Patent 2,293,567, granted August 18, 1942. The mask 11 has a stepped aperture 15 through which an electron current passes to the output plate 16. The magnitude of this electron current is changed in discrete steps as the input voltage to the deflection plates 17, 18 shifts the beam across the face of the mask and varies the number of electrons which pass through to the output plate 16. With a highly negative signal applied to deflecting plate 18, the electron stream will be deflected to the left of the aperture 15 in the mask 11, and no current will flow through the resistance 19 which is in series with the output plate 19 and the plate voltage supply 20. With no voltage drop through the resistance 19, the output voltage will be that of the voltage supply 20, as indicated in the plot of Fig. 3 at B+ on the relative output voltage scale. As the deflection plate 18 becomes more positive, the ribbon electron beam is deflected to the right and a portion of it passes through the aperture 15. This electron current flow through the resistance 19, and the resultant voltage drop across this resistance yields the stepwise decreasing characteristic shown in Fig. 3.

Another form of quantizer which will have an output-input characteristic such as is shown in Fig. 3 is the diode gate quantizer of Fig. 2. This type of amplitude-sensitive multistate device is described in detail in the B. M. Oliver application identified above, and its mode of operation will be covered only briefly here. In this arrangement, the continuously variable input signal is applied to the grid 21 of the vacuum tube 22, and the quantized or stepped output voltage is picked off at the plate 23. Positive and negative plate voltage terminals 38, 39 are connected to the vacuum tube 22 through load resistances 24 and 25 respectively, the purpose being to obtain intermediate voltage levels such as are found at points 26, 27 and 28 with which the input signal will be compared. With a large cathode resistance 25 the voltage at cathode 29 will follow that of the input signal quite closely, as in the well known cathode follower circuits. The diode pairs 31, 32 and 33 serve to effectively connect the auxiliary cathode resistances 34, 35 and 36, successively in parallel with the resistance 25 as the input signal and the point 29 increase progressively from negative to positive voltages and equal the voltages at points 26, 27 and 28 respectively. The sudden increases in plate current accompanying the effective reductions of cathode resistance give rise to increased voltage drops across the plate resistance 24, and an input-output characteristic corresponding to that shown in Fig. 3 will result.

Figure 4:
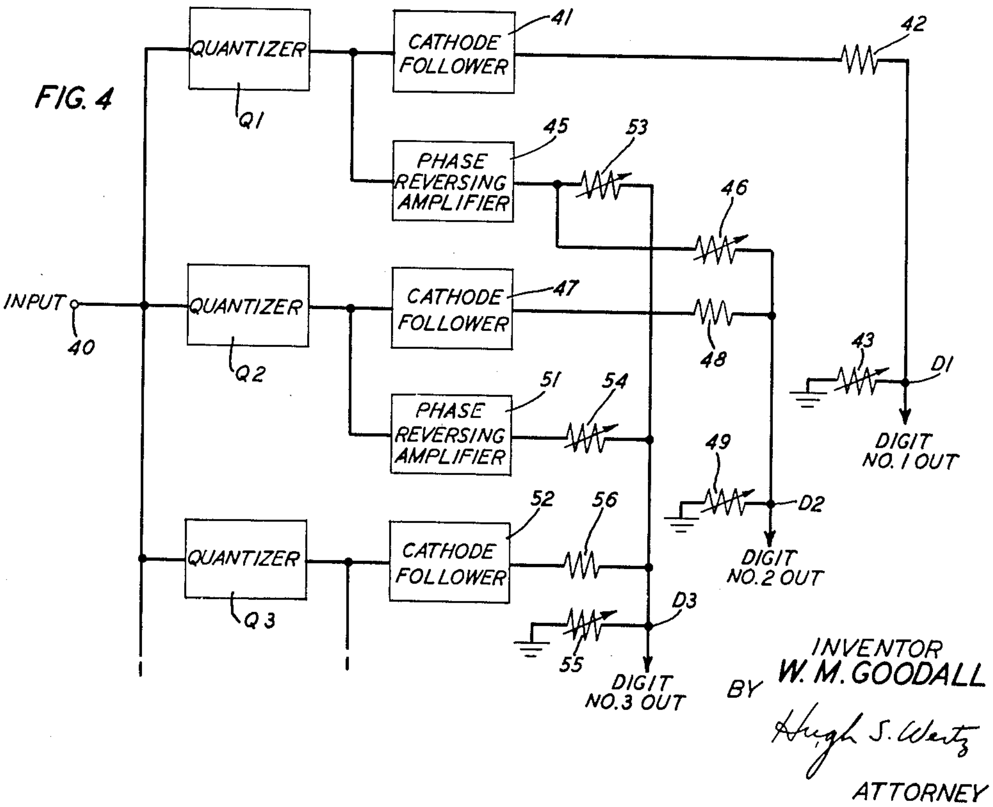
Fig. 4 represents a schematic circuit diagram of a coder in accordance with the invention.

Fig. 4 shows, by way of example and for purposes of illustration, the schematic circuit diagram of a coder which will translate the amplitude of an input signal into the serial digits of a numerical code. For purposes of illustrating the principles of the invention, the voltages developed at various points in the coder of Fig. 4 are plotted in Fig. 5 for a three digit quaternary code. In addition to the radix of four which is used in this illustrative example, other suitable radices or combinations of radices may be used, and the description will be generalized to apply to coders having mathematical bases other than four.

Referring to Fig. 4, when a signal of a given amplitude is applied to input terminal 40 of the coder, each of the digital output terminals D–1, D–2 and D–3 will assume one of four predetermined potentials, and the voltages at these terminals taken together will be representative of the input signal amplitude. With the three digit quaternary coder having the characteristics plotted in Fig. 5, 64 different amplitude ranges may be represented by the four possible voltage levels at the three digital outputs. Referring to the curves $D_1$, $D_2$ and $D_3$ on Fig. 5 note that for each of the 64 ranges (0–63 inclusive) of signal input amplitude, there is a different combination of digital outputs. For example, if the four stable states of each digital output are 0, 1, 2, and 3 from maximum to minimum, then an input amplitude of 3 would be 003 in the quaternary system, 5 would be 011, and 32 would be 200. In general it may be noted that the total number of levels which may be represented by a given coder is equal to $r^n$, where $r$ is the radix corresponding in this case to the number of stable output levels for each digit, and $n$ is the number of digits. In the example of a quaternary coder having three digits this formula gives the expected $4^3=64$ levels.

Figure 5:
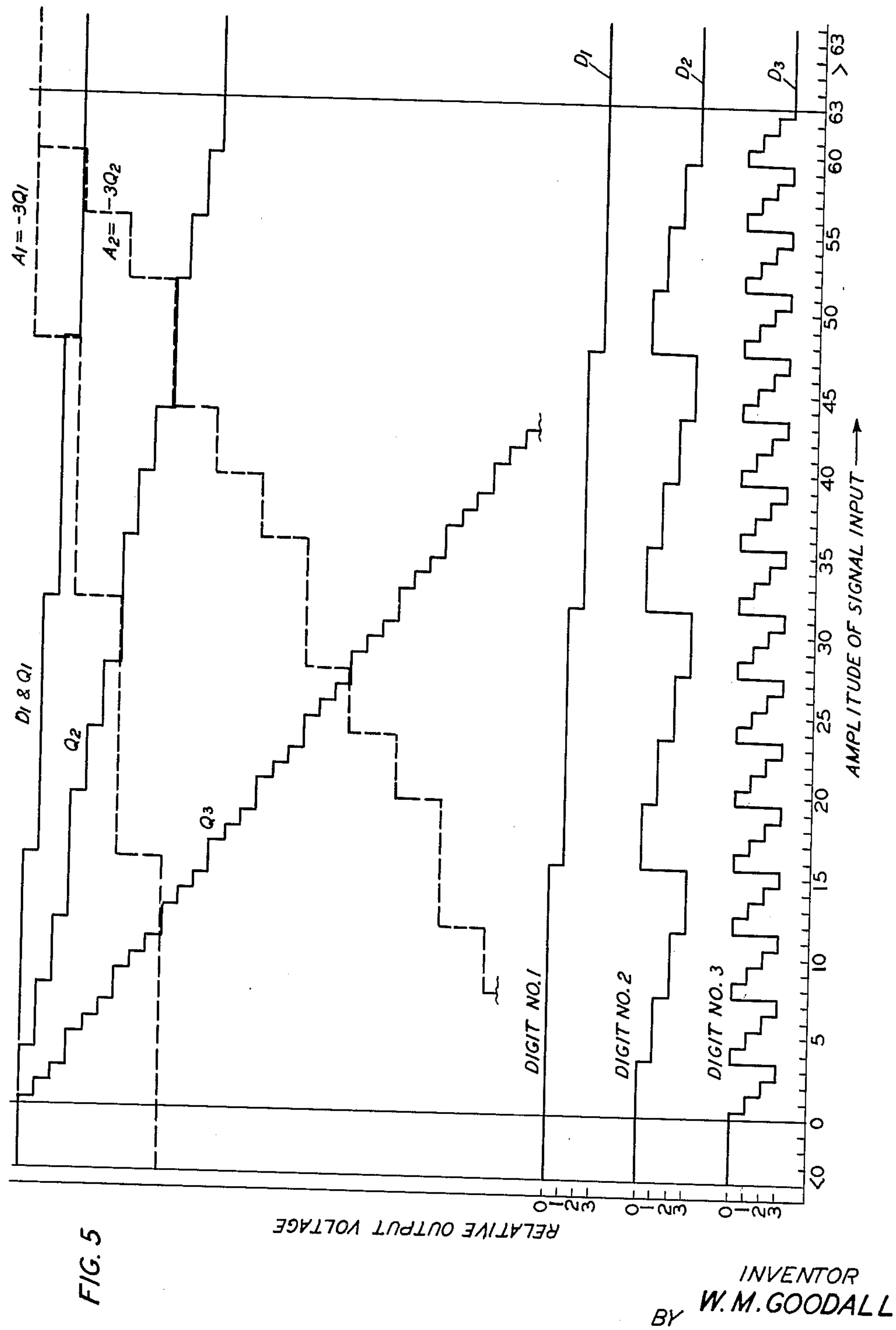
Fig. 5 is a chart showing the voltages at various points in the circuit of Fig. 4 for a quaternary coding system.

Considering the circuit of Fig. 4 and the corresponding plots of Fig. 5 in greater detail, the amplitude-sensitive multistate device, or quantizer, Q–1 has an input-output plot $Q_1$ which is similar in form to the plot $D_1$. Both plots $D_1$ and $Q_1$ have $r$ stable output levels, and $(r-1)$ transition points, where $r$ is the radix or numerical base which is employed. The quantizer Q–1 may be of any suitable type and may be one of those shown in Figs. 1 or 2. A cathode follower stage 41 is provided between the quantizer Q–1 and the digital output terminal D–1 to provide a low impedance output. A suitable output resistance network including resistances 42 and 43 is used to obtain a suitable output voltage level.

In comparing plots $D_1$ and $D_2$ of Fig. 5, it may be seen that there is a transition in both plots between input levels 15 and 16 for example. If these transitions do not occur precisely simultaneously, substantial coding errors may arise. For example, if the input signal gradually increases from level 15 to 16 and if the transition occurs in digits 2 and 3 before digit 1, the output from the coder progresses from 033 (15), to 000 (0), and then to 100 (16), instead of directly from 033 (15) to 100 (16). When decoded at a distant point, such a coding error introduces an extraneous pulse into the received signal. In accordance with the invention, this type of coding error is avoided by synchronizing the multiple transitions in a manner which will be explained in connection with the further description of Figs. 4 and 5.

The second digital output $D_2$ is obtained by combining the output from the quantizer Q–2 with the waveform $A_1$, which is the reversed and three times amplified output from quantizer Q–1. In comparing the repetitive stair-step wave form $D_2$ shown in Fig. 5 with the wave forms $Q_2$ and $A_1$, from which it is derived, it may be noted that the larger steps, from voltage level 3 back to level 1 must occur simultaneously with those of $D_1$, as both are derived from the transitions of $Q_1$. With this arrangement coding errors of the type noted in the preceding paragraph are impossible.

Referring again to the circuit of Fig. 4, the phase reversing amplifier 45 may be a single stage vacuum tube amplifier, and serves to supply the voltage $-3Q_1$ to output terminal D–2 as well as to isolate terminal D–1 from voltages generated by quantizers other than Q–1. The output from the quantizer Q–2 is applied to the output terminals D–2 via the cathode follower 47 and resistance 48. The output level of this digit may be adjusted by varying resistors 46 and 49 with respect to resistance 48. The three-to-one ratio between the signal amplitude at D–1 and the signal at D–2 originating at quantizer Q–1 may be obtained by attenuation in the resistance network 42–43 rather than by amplification by the network 45.

In terms of the radix $r$ of a coder of the type shown in Fig. 4, a number of generalizations may be made in respect to the numbers of transitions T which will occur, and the voltage range V which will be covered at various points in the circuit as the input signal covers its full range of values. As noted hereinbefore, the number of transitions in the plot $D_1$, is denoted by $T_{D1}=T_{Q1}=(r-1)$, and, with unit voltage steps, $V_{Q1}$ is also equal to $(r-1)$. For the amplified and reversed plot $A_1$, the number of transitions is the same as in $D_1$ or $Q_1$, but $V_{A1}=(r-1)^2$. In addition, for the second quantizer output $$T_{Q2}=V_{Q2}=r(r-1)$$

As applied to the quaternary system illustrated in Fig. 5, it may be seen that the number of transitions for the first digit $(T_{D1}=r-1)$ is four minus one, or three. Similarly, the voltage range $V_{D1}$ is also equal to three. In addition the voltage range of nine for the reversed and three times amplified output of $Q_1$ may be observed from the plot $A_1$ or calculated from the relationship: $V_{A1}=(r-1)^2$.

The third digital output is formed by combining the output of quantizer Q–3 with the voltages $A_1$ and $A_2$ which are the reversed and three times amplified outputs of the preceding quantizers. The outputs at terminal D–3 are derived from the phase reversing and isolating amplifiers 45 and 51 and from the cathode follower 52. Voltage levels are adjusted to correspond to the digital outputs at D–1 and D–2 by varying the resistors 53 through 55 with respect to resistance 56.

Additional digital outputs may be added, as indicated by the dotted lines on either side of the quantizer $Q_3$ shown in Fig. 4, when a coder having a radix lower than four is used, or when a greater number of levels is desired. Mathematically, the transitions T, and voltage levels V, for the $n$th digital stage of a coder having a radix $r$, are given by the following relationship:

$$V_{Qn}=T_{Qn}=T_{An}=(r-1)r^{(n-1)}$$
$$V_{An}=-(r-1)^2r^{(n-1)}$$

In each case it is understood that the $n$th digital output is made up of the output of the $n$th quantizer combined with the reversed and $(r-1)$ times amplified outputs of all the preceding quantizers.

Figure 6A:
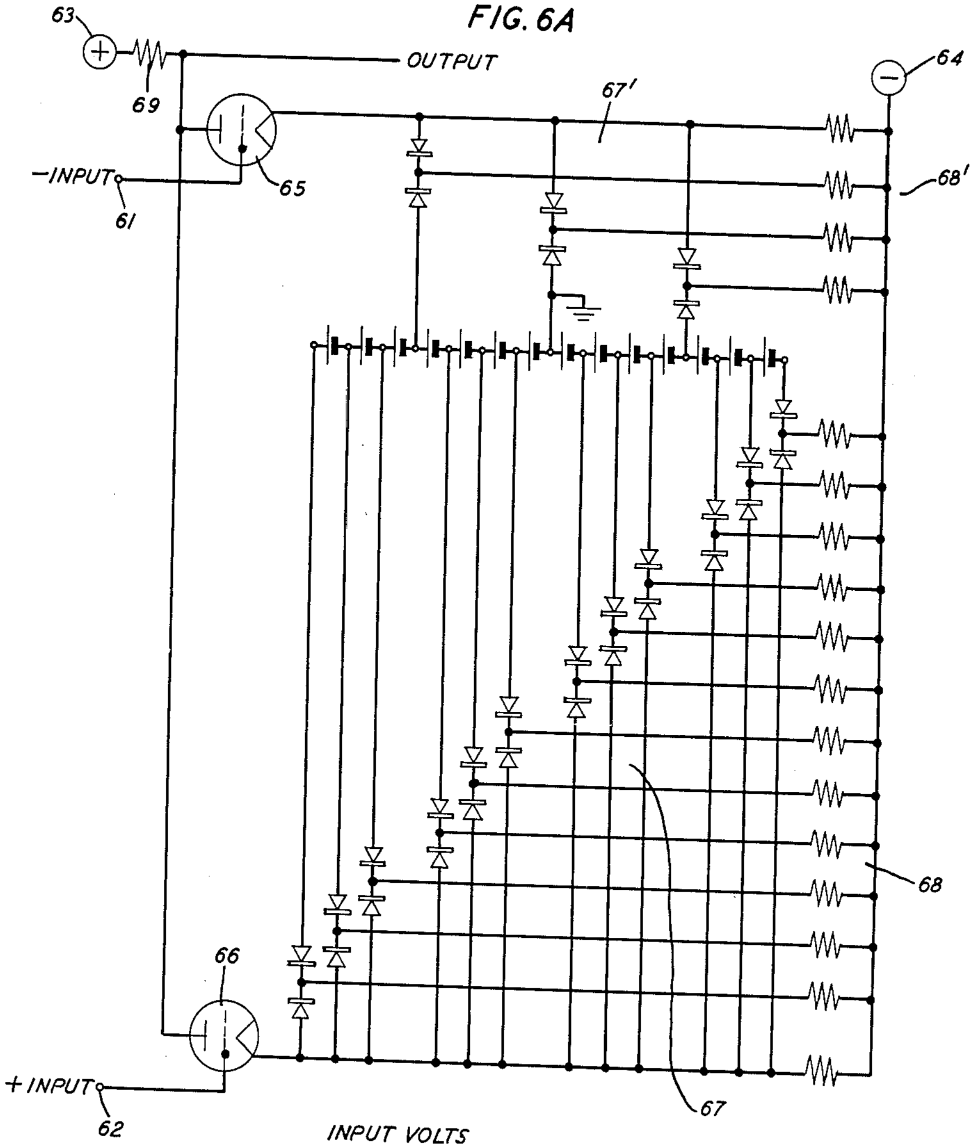
Fig. 6A shows a coder having a push-pull input for obtaining the second digit of a quaternary code.
Figure 6B:
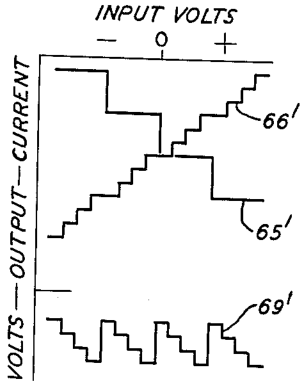
Fig. 6B is a plot of the electrical characteristics at various points in the circuit of Fig. 6A.

Figs. 6A and 6B illustrate a coder having a push-pull input 61, 62 for obtaining the second digit of a quaternary code, and the wave forms generated at various points in the circuit. This coder is a composite of two coders of the type shown in Fig. 3, with a single positive plate voltage supply 63 and a single negative voltage supply 64 for the two quantizer tubes 65 and 66. The plate current through these tubes increases stepwise as the input voltage increases and more of the diode switches 67, 67′ effectively place more of the diode switches 68, 68′ in parallel. The individual currents for tubes 65 and 66 are shown in curves 65′ and 66′, respectively, of Fig. 6B, and the voltage developed across the common load resistance 69 is shown at 69′ in Fig. 6B.

It is to be understood that the above-described arrangements are illustrative of the application of the principles of the invention. Numerous other arrangements may be devised by those skilled in the art without departing from the spirit and scope of the invention.

What is claimed is:

1. A coder for producing a plurality of code digits in accordance with the level of an input signal comprising a first quantizer having a first digital output, a second quantizer, a first combining circuit for simultaneously combining the outputs of said first and second quantizers to form a second digital output, a third quantizer, and a second combining circuit for simultaneously combining the outputs of all three of said quantizers to give a third digital output.

2. An electrical coding system comprising a first quantizer producing output voltage steps of a given magnitude in response to input signals, a second quantizer producing a greater number of voltage steps of a predetermined lesser magnitude in response to input signals, and means for subtractively combining the outputs of said quantizers.

3. In a coder for a modulation system in which the digital radix is *r*, where *r* is a number greater than two, a first quantizer having $r(r-1)$ transition points and output voltage steps of a predetermined magnitude, a second quantizer having $(r-1)$ transition points and output voltage steps of a magnitude greater than and equal to $(r-1)$ times said predetermined magnitude, and means for combining the outputs of said first and second quantizers.

4. In a coder for translating variable amplitude input signals into digital form; first, second and third quantizers; first, second and third direct output circuits from corresponding ones of said quantizers; first and second phase reversal output circuits from said first and second quantizers; a first digital output circuit connected to said first direct output circuit, a second digital output circuit connected to said second direct output circuit and said first phase reversal output circuit, and a third digital output circuit connected to said third direct output circuit and to said first and second phase reversal circuits.

5. A coder as defined in claim 4 in which the various quantizers have no concurrent transition points.

6. A coder as defined in claim 4 in which the first and second direct output circuits have greater attenuation than the phase reversal circuits.

7. An electrical coding system comprising a first quantizer producing output voltage steps of a given magnitude in response to input signals, a second quantizer producing a greater number of voltage steps of a predetermined lesser magnitude in response to input signals, the transitions between output voltage steps of said second quantizer being produced at different input voltages than the transitions between output voltage steps of said first quantizer, and means for subtractively combining the outputs of said quantizers.

References Cited in the file of this patent

UNITED STATES PATENTS

| | | |
|---|---|---|
| 2,539,623 | Heising | Jan. 30, 1951 |
| 2,573,813 | Shumard | Nov. 6, 1951 |
| 2,602,158 | Carbrey | July 1, 1952 |
| 2,602,918 | Kretzmer | July 8, 1952 |

OTHER REFERENCES

Proc. of the IRE, May 1950, pages 511–514.